US010411546B2

(12) United States Patent
Hamagishi et al.

(10) Patent No.: US 10,411,546 B2
(45) Date of Patent: Sep. 10, 2019

(54) MOTOR WITH SEAL MEMBER HAVING FIRST AND SECOND SEAL PORTIONS FITTED THROUGH INCLINED SURFACE

(71) Applicant: Nidec Corporation, Minami-ku, Kyoto (JP)

(72) Inventors: Kenichiro Hamagishi, Kyoto (JP); Hironori Kizaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 715 days.

(21) Appl. No.: 15/075,949

(22) Filed: Mar. 21, 2016

(65) Prior Publication Data
US 2016/0294246 A1 Oct. 6, 2016

(30) Foreign Application Priority Data
Mar. 31, 2015 (JP) .................. 2015-074563

(51) Int. Cl.
*H02K 5/132* (2006.01)
*H02K 5/10* (2006.01)
*H02K 5/14* (2006.01)

(52) U.S. Cl.
CPC .............. *H02K 5/10* (2013.01); *H02K 5/148* (2013.01); *H02K 5/14* (2013.01)

(58) Field of Classification Search
CPC .. H02K 5/10; H02K 5/12; H02K 5/14; H02K 5/148; H02K 5/132; H02K 5/136
USPC ................................ 310/88, 87, 89
See application file for complete search history.

(56) References Cited

U.S. PATENT DOCUMENTS

| 2,300,957 A | * | 11/1942 | Miner, Jr. | ................. H02K 5/04 310/40 R |
| 4,959,576 A | * | 9/1990 | Horibe | .................. H02K 5/141 310/232 |
| 5,010,265 A | * | 4/1991 | Tanaka | .................... F02N 15/00 290/48 |
| 5,608,280 A | * | 3/1997 | Tamemoto | ............. H01R 39/06 310/237 |

(Continued)

FOREIGN PATENT DOCUMENTS

| JP | 2014-039381 A | 2/2014 |
| JP | 2014-110697 A | 6/2014 |

OTHER PUBLICATIONS

JP2014039381 English Translation.*

*Primary Examiner* — Julio C. Gonzalez
*Assistant Examiner* — Maged M Almawri
(74) *Attorney, Agent, or Firm* — Cantor Colburn LLP

(57) ABSTRACT

A motor may include an armature; a cylindrical housing; a brush card assembly; a cylindrical bracket positioned under the brush card assembly and directly fixed to the housing; and a seal member made of elastomer. The brush card assembly may include a cylindrical portion and a flange portion. The seal member may include a first seal portion fitted between the top surface of the flange portion and the housing, or the bottom surface of the flange portion and the bracket, in an axial direction while contacting the top surface and the housing or the bottom surface and the bracket. At least one of a radially inner surface of the housing and a radially inner surface of the bracket may include an inclined surface. The first seal portion may be fitted between the housing and the bracket through the inclined surface while contacting the housing and the bracket.

10 Claims, 8 Drawing Sheets

(56) References Cited

U.S. PATENT DOCUMENTS

| | | | | |
|---|---|---|---|---|
| 6,515,398 B1* | 2/2003 | Fudono | ................ | H02K 5/141 |
| | | | | 310/239 |
| 6,756,711 B2* | 6/2004 | Matsuyama | ........... | H02K 5/225 |
| | | | | 310/68 B |
| 7,109,617 B2* | 9/2006 | Mizutani | .............. | H01R 39/383 |
| | | | | 29/596 |
| 7,671,505 B2* | 3/2010 | Yamamoto | ............. | H02K 5/148 |
| | | | | 310/239 |
| 7,687,967 B2* | 3/2010 | Mashino | ............. | H01R 39/385 |
| | | | | 310/239 |
| 7,859,148 B2* | 12/2010 | Mizutani | ................ | H01R 39/38 |
| | | | | 310/238 |
| 8,421,300 B2* | 4/2013 | Kokubu | ................ | H02K 5/148 |
| | | | | 310/239 |
| 8,723,381 B2* | 5/2014 | Kokubu | ................ | H02K 5/148 |
| | | | | 310/239 |
| 2011/0057526 A1* | 3/2011 | Kokubu | ................ | H02K 5/148 |
| | | | | 310/83 |
| 2011/0273042 A1* | 11/2011 | Isoda | ................... | H02K 11/046 |
| | | | | 310/63 |
| 2013/0020886 A1* | 1/2013 | Chan | ..................... | F02N 15/006 |
| | | | | 310/43 |
| 2013/0193789 A1* | 8/2013 | Kokubu | ................ | H02K 5/148 |
| | | | | 310/83 |

* cited by examiner

MOTOR WITH SEAL MEMBER HAVING FIRST AND SECOND SEAL PORTIONS FITTED THROUGH INCLINED SURFACE

CROSS REFERENCE TO RELATED APPLICATION

The present invention claims priority under 35 U.S.C. § 119 to Japanese Application No. 2015-074563 filed Mar. 31, 2015, the entire content of which is incorporated herein by reference.

FIELD OF THE INVENTION

The present invention relates to a motor.

BACKGROUND

Among typical types of electric motor, there is a motor which includes a seal portion for sealing a gap between members configuring an outer frame of the motor. For example, Japanese Patent Application Publication No. 2014-110697 discloses an electric motor which includes a brush holder in which a seal portion made of rubber is installed. With the seal portion, the brush holder is held by a yoke and a bracket. This electric motor may be configured to prevent water from being infiltrated into the motor by the seal portion, such that the electric motor may be used outdoors such as on a vehicle and the like.

In the electric motor as described above, the seal portion is sandwiched between the yoke and the bracket as well as the brush holder (brush card) and the yoke (housing). In this case, an axial dimension between the brush holder and the yoke, and an axial dimension between the yoke and the bracket may be easily changed due to a dimensional error entailed in the elements or the assembly thereof. Therefore, when the axial dimension of the seal portion is uniform, both of the gap between the brush holder and the yoke and the gap between the yoke and the bracket may not be sufficiently sealed and waterproof property of the electric motor may be degraded.

In relation to this structure, for example, if a shape of a portion sandwiched between the brush holder and the yoke in the seal portion and a shape of a portion sandwiched between the yoke and the bracket are different from each other, it is easy to very appropriately seal both of the gap between the brush holder and the yoke and the gap between the yoke and the bracket. In this case, however, in the seal portion, there is a need to make the portion sandwiched between the brush holder and the yoke thin, the portion sandwiched between the yoke and the bracket thick, etc. Due to the shape of the seal portion as described above, the axial dimension is not uniform but is complicated, and as a result time and costs required to manufacture the seal portion may be increased.

SUMMARY

A first exemplary embodiment of the present disclosure is a motor including a shaft having its center on a center axis extending in a vertical direction. The motor includes: an armature fixed to the shaft; a cylindrical housing having a lower opening portion which is open toward a lower side and accommodating the armature; a brush card assembly positioned in the lower opening portion and supplying a current to the armature; a cylindrical bracket positioned under the brush card assembly and directly fixed to the housing; and a seal member positioned between the housing and the bracket and made of elastomer. The brush card assembly has a brush card cylindrical portion having a cylindrical shape and enclosing the shaft in a circumferential direction and a brush card flange portion extending radially outward from the brush card cylindrical portion. The seal member has a first seal portion fitted between a top surface of the brush card flange portion and the housing or a bottom surface of the brush card flange portion and the bracket in an axial direction while contacting the top surface and the housing or the bottom surface and the bracket. At least one of a radially inner surface of the housing and a radially inner surface of the bracket have an inclined surface farther away from the center axis as it goes toward a bonded surface between the housing and the bracket. The first seal portion is fitted between the housing and the bracket through the inclined surface while contacting the housing and the bracket.

According to a first exemplary embodiment of the present disclosure, the motor having the structure capable of simplifying the shape of the seal member while securing the waterproof property may be provided.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Hereinafter, a motor according to a first exemplary embodiment of the present disclosure will be described with reference to the accompanying drawings. Further, the scope of the present disclosure is not limited to the following embodiments, but may be arbitrarily changed within the technical spirit of the present disclosure. Further, in the following drawings, to easily understand each component, a scale, the number, etc., of each structure may be different from those of actual structures.

Further, the drawings illustrate an XYZ coordinate system as an appropriate three-dimensional orthogonal coordinate system. In the XYZ coordinate system, Z-axis direction is a direction parallel with an axial direction of a center axis J illustrated in FIG. 1. X-axis direction is a direction orthogonal to the Z-axis direction and is defined as a direction in which a connector part 53 protrudes. Y-axis direction is defined as a direction orthogonal to both the X-axis direction and the Z-axis direction.

Further, in the following description, the direction (Z-axis direction) in which the center axis J extends is defined as the vertical direction. A positive side (+Z side) in the Z-axis direction is defined as an 'upper side' and a negative side (−Z side) in the Z-axis direction is defined as a 'lower side'. It is to be understood that the terms of the vertical direction, the upper side and the lower side are used for explanation only, and they do not limit the actual positional relation or direction. Also, unless otherwise explained, a direction (Z-axis direction) parallel with the center axis J is simply referred to as 'axial direction', a radial direction having its center on the center axis J is simply referred to as 'radial direction', and a circumferential direction having its center on the center axis J (θZ direction), that is, a direction along the circumference of the center axis J, is simply referred to as 'circumferential direction'.

Furthermore, herein, descriptions such as being axially extended do not only refer to a case of strictly being extended in the axial direction (z-axis direction), but it may also include a case of being extended in a direction inclined at less than 45° relative to the axial direction. Also, descriptions such as being radially extended do not only refer to a case of strictly being extended in the radial direction, that is, the direction perpendicular to the axial direction (z-axis direction), but it may also include a case of being extended in a direction inclined at less than 45° relative to the radial direction.

Figure 1:
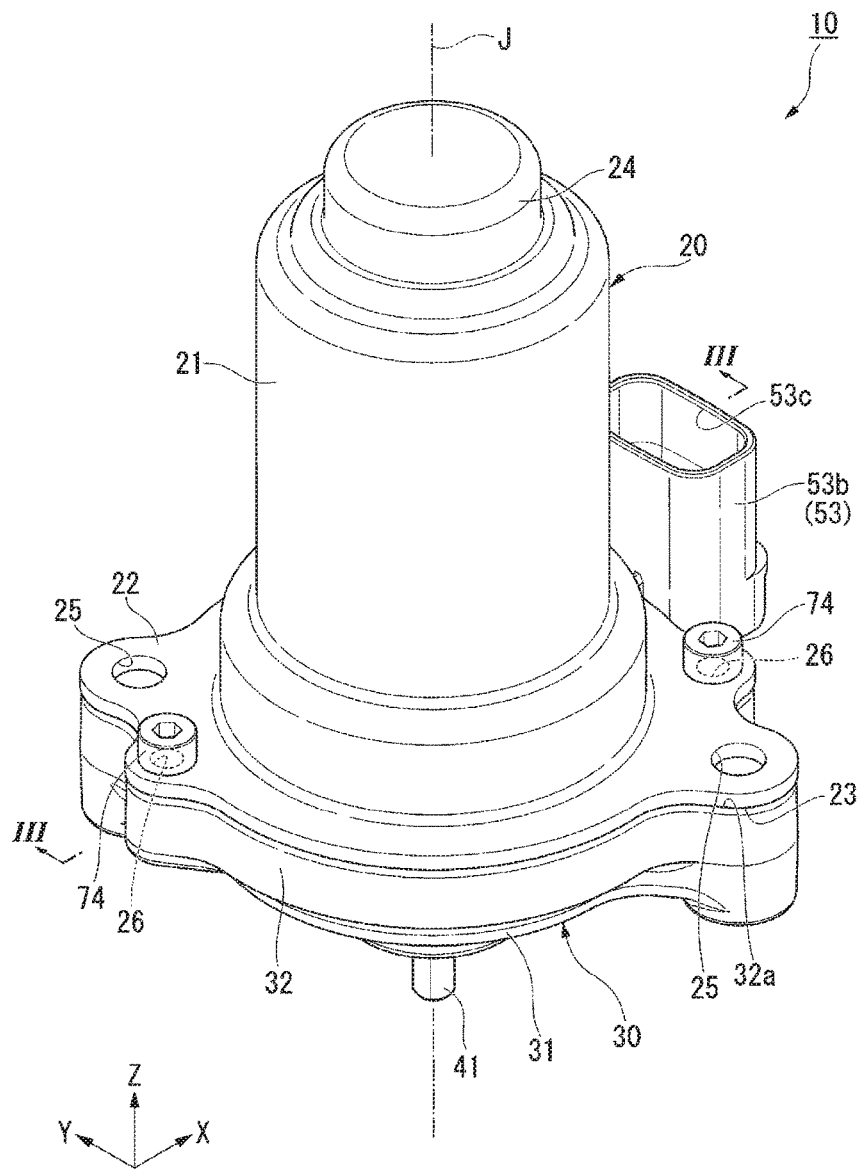
FIG. 1 is a perspective view illustrating a motor according to an exemplary embodiment of the present disclosure.
Figure 2:
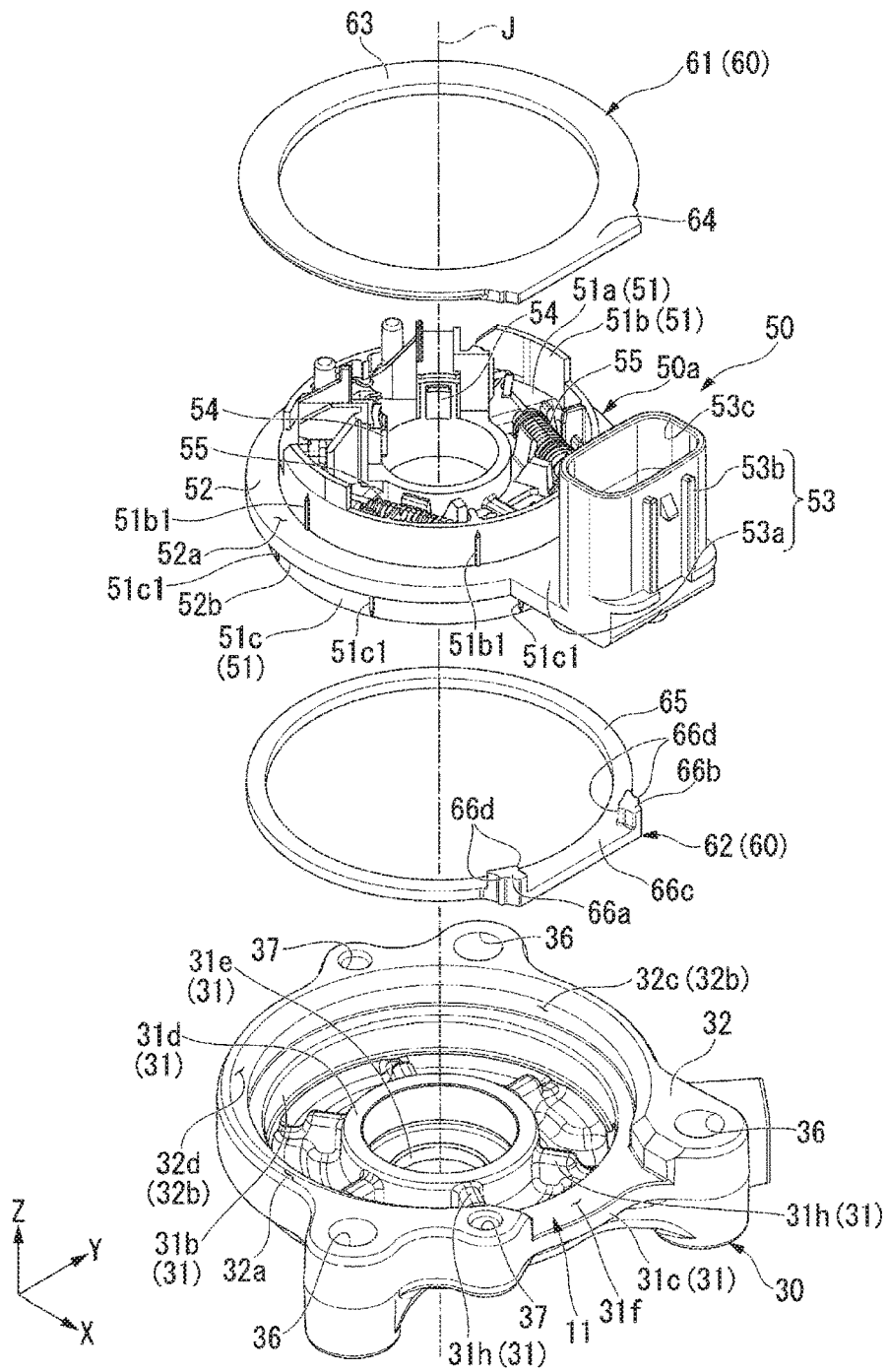
FIG. 2 is an exploded perspective view illustrating a portion of the motor according to the exemplary embodiment of the present disclosure.
Figure 3:
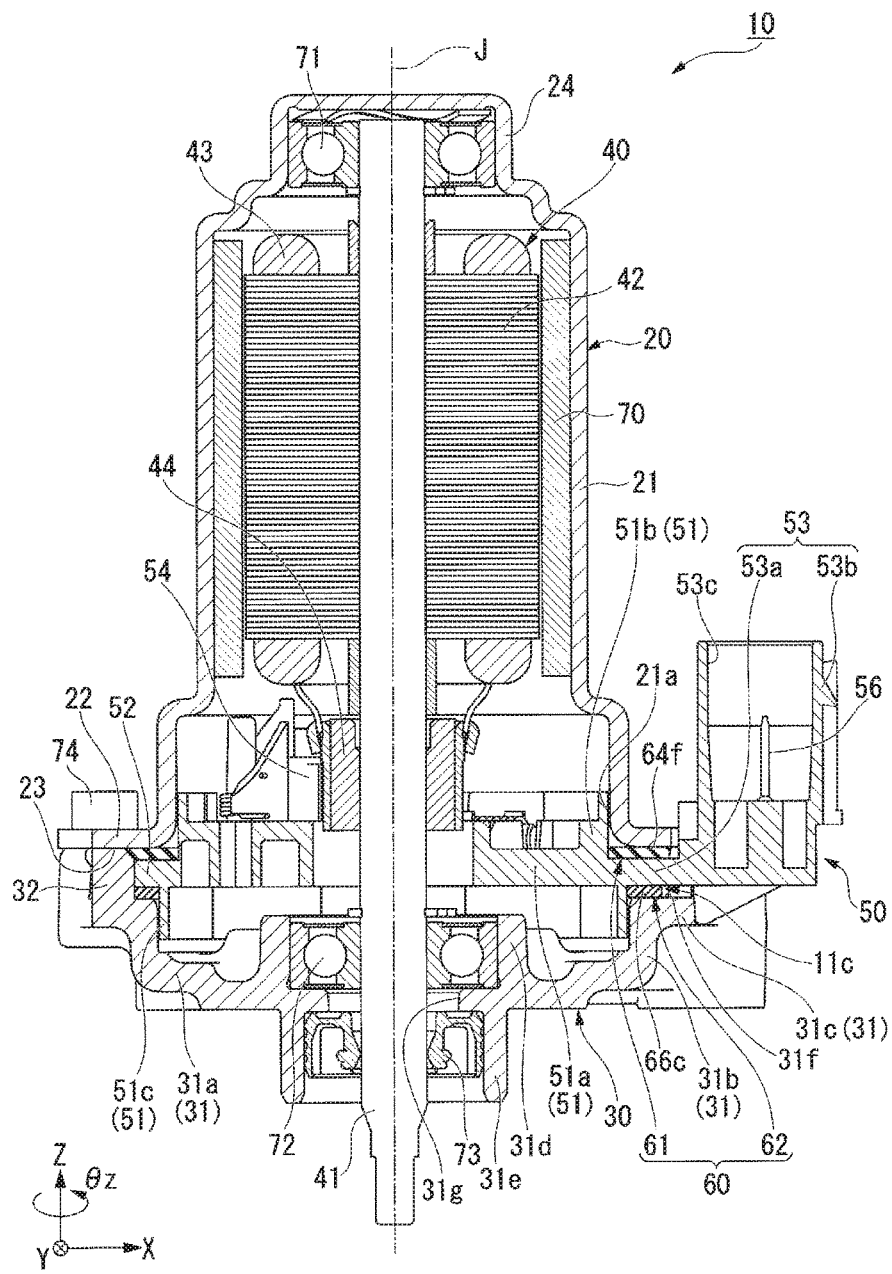
FIG. 3 is a diagram illustrating the motor according to the exemplary embodiment of the present disclosure and is a cross-sectional view taken along the line III-III of FIG. 1.
Figure 4:
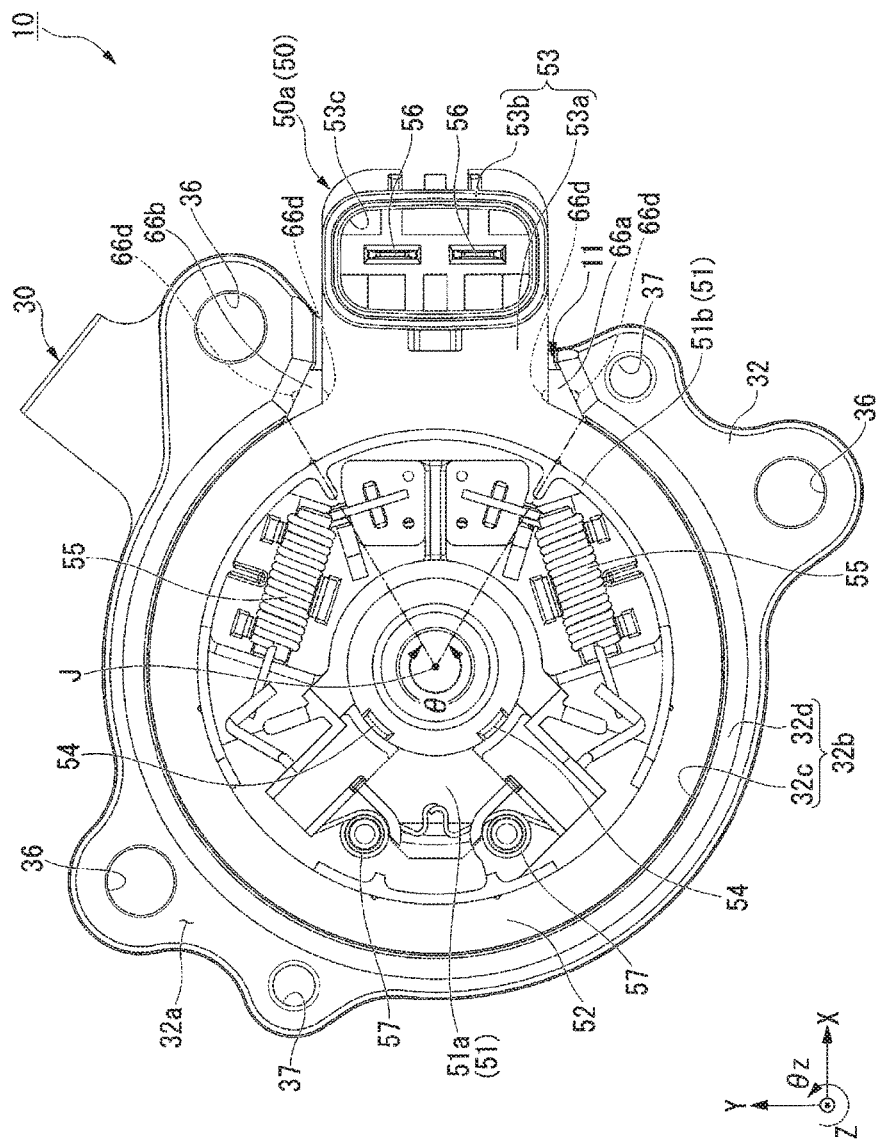
FIG. 4 is a plan view illustrating a portion of the motor according to the exemplary embodiment of the present disclosure.

FIGS. 1 to 4 illustrate a motor 10 according to the first exemplary embodiment of the present disclosure. FIG. 1 is a perspective view of the motor 10. FIG. 2 is an exploded perspective view of the motor 10 in which a housing 20, an armature 40, etc., are omitted. FIG. 3 is a cross-sectional view of the motor 10 of FIG. 1 taken along the line III-III FIG. 4 is a plan view of the motor 10 in which the housing 20, the armature 40, etc., are omitted.

As illustrated in FIGS. 1 to 3, the motor 10 includes a housing 20, a bracket 30, a shaft 41, an armature 40, a commutator 44, a brush card assembly 50, a seal member 60, a magnet 70, a upper bearing 71, a lower bearing 72, and an oil seal 73.

As illustrated in FIG. 3, the shaft 41 has its center on a vertically (Z-axis direction) extending central shaft J. The shaft 41 is rotatably supported around (±θZ direction) the center axis J. A lower end of the shaft 41 is exposed outside the bracket 30 through an output shaft hole 31g which will be described in more detail in a subsequent section.

The armature 40 is fixed to the shaft 41. The armature 40 rotates around (±θZ direction) the center axis J, together with the shaft 41. The armature 40 has a core 42 and a coil 43. The core 42 is fixed to an outer circumferential surface of the shaft 41. The core 43 is wound around the core 42.

The commutator 44 is positioned under the armature 40 and is fixed to the shaft 41. The commutator 44 is electrically connected to the coil 43. The commutator 44 contacts a brush 54 which will be described in more detail in a subsequent section. The coil 43 is supplied with a current from the commutator 44 through the brush 54. With this configuration, the armature 40 is excited.

The upper bearing 71 and the lower bearing 72 rotatably support the shaft 41. The upper bearing 71 is positioned above the armature 40. The upper bearing 71 is held by an upper bearing holding portion 24 of the housing 20, which will be described in more detail in a subsequent section. The lower bearing 72 is positioned below the commutator 44. The lower bearing 72 is held by a lower bearing holding portion 31d of the bracket 30, which will be described in more detail in a subsequent section.

A magnet 70 is fixed to an inner circumferential surface of the housing 20. The magnet 70 faces the armature 40 in the radial direction. An N pole and an S pole which are magnetic poles of the magnet 70 are alternately arranged in the circumferential direction. The magnet 70 may be a single member or may also be segmented into a plurality of magnets and disposed in the circumferential direction.

The oil seal 73 is held by an oil seal holding portion 31e which will be described in more detail in a subsequent section. The oil seal 73 serves to prevent oil outside the motor 10 from being infiltrated into the motor 10 through the lower bearing 72.

The housing 20 has a cylindrical shape with a cap to house the armature 40. The housing 20 is made of, for example, metal. The housing 20 is made of metal, for example, iron. The housing 20 is made of iron, such that the housing 20 may serve as the yoke of the magnet 70.

The housing 20 has a housing cylindrical portion 21 and a housing flange portion 22. The housing cylindrical portion 21 has a cylindrical shape with a cap while having a lower opening portion 21a which is open toward a lower side. That is, the housing 20 has the lower opening portion 21a which is open at the lower portion thereof. The housing cylindrical portion 21 has the upper bearing holding portion 24 disposed at an upper end thereof. The upper bearing 71 is held on a radially inner side of the upper bearing holding portion 24.

A diameter of the housing cylindrical portion 21 is increased stepwise in an order of the upper bearing holding portion 24, a cylindrical shape portion of the lower portion of the upper bearing holding portion 24, and a lower opening portion 21a. That is, according to this embodiment, the housing cylindrical portion 21 has a multi-stage cylindrical shape which has the cap and is concentric with the central shaft J.

The housing flange portion 22 extends radially outward from a lower end of the housing cylindrical portion 21. As illustrated in FIG. 1, the housing flange portion 22 has a mounting hole portion 25 and a fixed hole portion 26 which are hole portions axially penetrating through the housing flange portion 22.

The mounting hole portion 25 has a screw penetrated therethrough to mount the motor 10 on, for example, a vehicle body, etc. The fixed hole portion 26 has a screw 74 penetrated therethrough to fix the housing 20 and the bracket 30. The number of mounting hole portions 25 and the number of fixed hole portions 26 are not particularly limited. According to this embodiment, the housing flange portion 22 has, for example, three mounting hole portions 25. According to this embodiment, the housing flange portion 22 has, for example, two mounting hole portions 26.

As illustrated in FIGS. 2 and 3, the bracket 30 is positioned under the brush card assembly 50. The bracket 30 is directly fixed to the housing 20. The bracket 30 has a cylindrical shape. The bracket 30 is made of, for example, metal. The bracket 30 is made of metal, for example, aluminum. As illustrated in FIG. 2, the bracket 30 has a bracket body 31 and a fixed wall portion 32.

As illustrated in FIG. 3, the bracket body 31 has a bracket bottom portion 31a, a bracket cylindrical portion 31b, a bracket flange portion 31c, the lower bearing holding portion 31d, the oil seal holding portion 31e, and a reinforcing wall 31h.

The bracket bottom portion 31a covers a lower portion of a brush card cylindrical portion 51 which will be described in more detail in a subsequent section. The bracket bottom portion 31a has a the output shaft hole 31g penetrating through the center of the bracket bottom portion 31a in the axial direction. The shaft 41 penetrates through the output shaft hole 31g.

The bracket cylindrical portion 31b extends upwardly from a radial outer edge of the bracket bottom portion 31a. The bracket flange portion 31c extends radially outward from an upper end of the bracket cylindrical portion 31b.

The lower bearing holding portion 31d extends upwardly from the bracket bottom portion 31a. The lower bearing holding portion 31d is disposed on a radially outer side than the output shaft hole 31g. The lower bearing holding portion 31d has a cylindrical shape enclosing the shaft 41 in the circumferential direction. The lower bearing 72 is held inside the lower bearing holding portion 31d.

The oil seal holding portion 31e extends downwardly from the bracket bottom portion 31a. The oil seal holding portion 31e is disposed on a radially outer side than the output shaft hole 31g. The oil seal holding portion 31e has a cylindrical shape enclosing the shaft 41 in the circumferential direction. The oil seal 73 is held inside the oil seal holding portion 31e.

As illustrated in FIG. 2, the reinforcing wall 31h extends radially outward from an outer circumferential surface of the lower bearing holding portion 31d to before an inner circumferential surface of the bracket cylindrical portion 31b. That is, a radially outer end of the reinforcing wall 31h is positioned to be spaced radially inward from the inner circumferential surface of the bracket cylindrical portion 31b. In the example of FIG. 2, the reinforcing wall 31h is installed, for example, in six. The six reinforcing walls 31h are disposed at an equal distance in the circumferential direction. Even when a load is applied to the entire bracket 30 around the lower bearing 72, the reinforcing wall 31h may suppress the bracket 30 from being warped.

The fixed wall portion 32 is disposed on a radially outer edge of the bracket body 31. The fixed wall portion 32 more extends axially upwardly than the bracket flange portion 31c. As illustrated in FIGS. 2 and 4, the fixed wall portion 32 extends in the circumferential direction. According to this embodiment, the fixed wall portion 32 is positioned over the entire circumference, except for a radial opening 11.

The fixed wall portion 32 has a mounting hole portion 36 and the fixed hole portion 37 which are hole portions axially penetrating through the fixed wall portion 32. The mounting hole portion 36 axially overlaps with the mounting hole portion 25 of the housing 20. That is, a screw by which the motor 10 is mounted on, for example, a vehicle body, etc., passes through the mounting hole portion 25 of the housing 20 and the mounting hole portion 36 of the bracket. According to this embodiment, the fixed wall portion 32 has, for example, three mounting hole portions 36.

The fixed hole portion 37 is, for example, a screw hole having a thread provided at an inside thereof. The fixed hole portion 37 axially overlaps with the fixed hole portion 26 of the housing 20. A screw 74 illustrated in FIG. 1 is pushed into the fixed hole portion 37, which is the screw hole, through the fixed hole portion 26 of the housing 20. By this, the housing 20 is fixed to the bracket 30. As illustrated in FIG. 4, according to this embodiment, the fixed wall portion 32 has, for example, two fixed hole portions 37. The two fixed hole portions 37 are disposed on portions opposite to each other based on the center axis J.

As illustrated in FIG. 1, a housing flange portion bottom surface (bonded surface) 23 which is the bottom surface of the housing flange portion 22 and a fixed wall portion top surface (bonded surface) 32a which is the top surface of the fixed wall portion 32 contact each other. That is, the housing flange portion bottom surface 23 and the fixed wall portion top surface 32a are the bonded surface between the housing 20 and the bracket 30. The housing flange portion bottom surface 23 is a lower end surface of the housing 20. The fixed wall portion top surface 32a is an upper end surface of the bracket 30.

Figure 5:
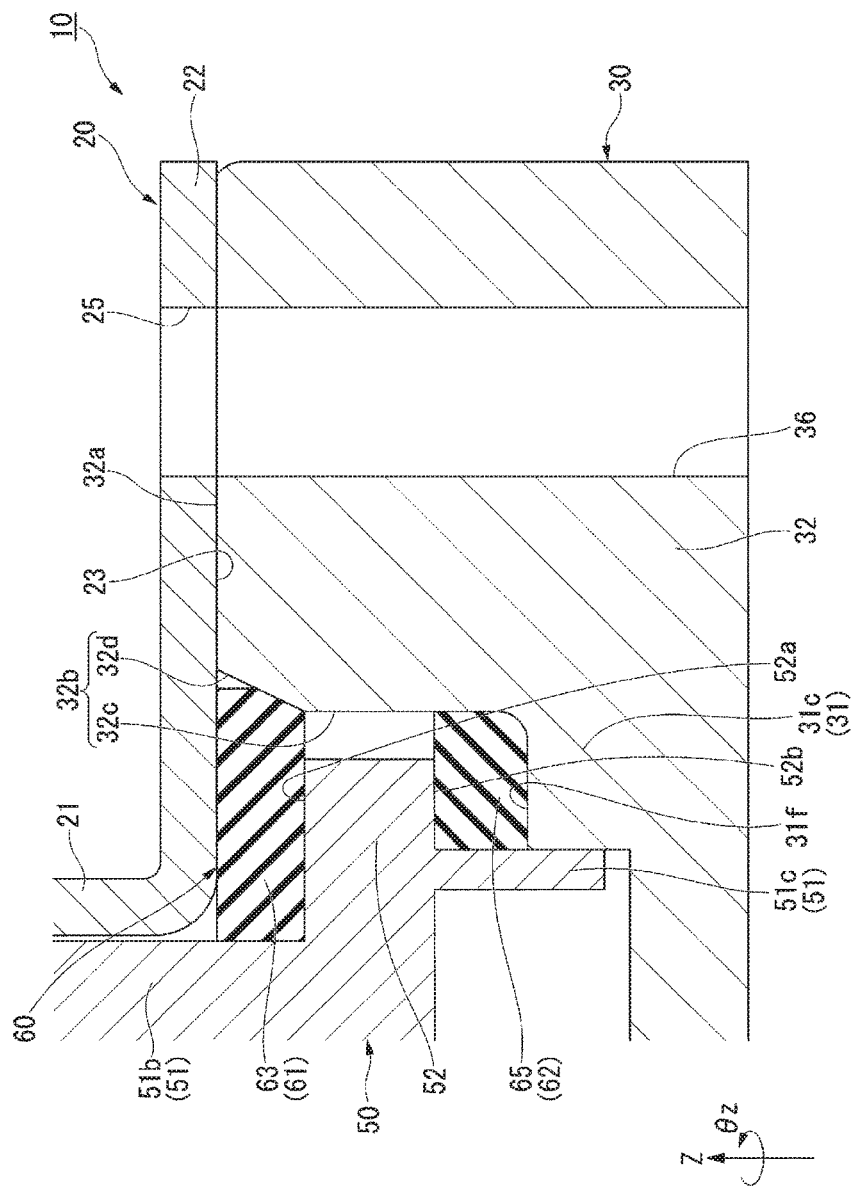
FIG. 5 is a cross-sectional view illustrating a portion of the motor according to the exemplary embodiment of the present disclosure.

FIG. 5 is a diagram illustrating a portion of the motor 10 and is a cross-sectional view illustrating a portion where the fixed wall portion 32 contacts the seal member 60. As illustrated in FIG. 5, a fixed wall portion inner side surface 32b which is a radially inner surface of the fixed wall portion 32 has an inner wall surface 32c and an inclined surface 32d. That is, a radially inner surface of the bracket 30 has the inclined surface 32d. The inner wall surface 32c is a surface extending upwardly from a bracket flange portion top surface 31f which is the top surface of the bracket flange portion 31c.

The inclined surface 32d is connected to an upper end of the inner wall surface 32c and the fixed wall portion top surface 32a. The inclined surface 32d is getting farther away from the center axis J as it goes from the bottom toward the top. That is, the inclined surface 32d is getting farther away from the center axis J as it goes toward the fixed wall portion top surface 32a which is the bonded surface between the housing 20 and the bracket 30. The inclined surface 32d is a chamfered surface that a radially inner edge at the upper end of the fixed wall portion 32 is chamfered.

As illustrated in FIG. 4, the inclined surface 32d extends in a circumferential direction. According to this embodiment, an angle θ formed by a line segment connecting between one circumferential end of the inclined surface 32d and the center axis J and a line segment connecting between the other end in the circumferential direction of the inclined surface 32d and the center axis J is equal to or more than 180°. That is, according to this embodiment, the inclined surface 32d is installed over the range of 180° or more in the circumferential direction.

According to this embodiment, the inclined surface 32d is installed over the entire circumference of the fixed wall portion inner side 32b. According to this embodiment, the fixed wall portion 32 is installed over the entire circumference except for the radial opening 11 to be described below, such that the inclined surface 32d is installed over the entire circumference except for the radial opening 11.

As illustrated in FIGS. 2 and 3, the motor 10 is provided with the radial opening 11. The radial opening 11 is positioned between the housing flange portion bottom surface 23 and the bracket flange portion top surface 31f. That is, the radial opening 11 is positioned between the housing 20 and the axial direction of the bracket 30. The radial opening 11 is open in the radial direction.

As illustrated in FIGS. 3 and 4, the radial opening 11 is enclosed by the fixed wall portion 32, the housing flange portion bottom surface 23, and the bracket flange portion top surface 31f. The radial opening 11 radially penetrates through the housing 20 and the bracket 30. The radial opening 11 is positioned in a region in which the housing 20 and the bracket 30 are bonded to each other, such that an inside space of the housing 20 and the bracket 30 communicates with an outside space of the housing 20 and the bracket 30.

As illustrated in FIG. 3, the brush card assembly 50 is positioned in the lower opening 21a of the housing 20. As illustrated in FIGS. 2 and 4, the brush card assembly 50 has a brush card 50a, a brush 54, a choke coil 55, a connection terminal 56, and a spring 57.

As illustrated in FIG. 2, the brush card 50a has a brush card cylindrical portion 51, a brush card flange portion 52, and a connector part 53. That is, the brush card assembly 50, has the brush card cylindrical portion 51, the brush card flange portion 52, and the connector part 53.

As illustrated in FIGS. 2 and 3, the brush card cylindrical portion 51 has a cylindrical shape enclosing the shaft 41 in a circumferential direction. According to this embodiment, the brush card cylindrical portion 51 has, for example, a cylindrical shape which is concentric with the center axis J. The brush card cylindrical portion 51 has a circular portion 51a, an upper wall portion 51b, and a lower wall portion 51c. The brush card 50a may be made of, for example, synthetic resin.

The circular portion 51a has a circular shape enclosing the shaft 41. The circular portion 51a has a plate shape expanded in the radial direction. The circular portion 51a has a holding portion which holds a brush 54, a choke coil 55, a connection terminal 56, a spring 57, etc. The upper wall portion 51b extends upwardly from a radially outer edge of the circular portion 51a. As illustrated in FIG. 3, the upper wall portion 51b is fitted in the lower opening 21a of the housing 20. The lower wall portion 51c extends downwardly from the brush card flange portion 52. The lower wall portion 51c is fitted in an inside of the bracket cylindrical portion 31b of the bracket 30.

As illustrated in FIG. 2, upper protrusions 51b1 are positioned on an outer circumferential surface of the upper wall portion 51b. The plurality of upper protrusions 51b1 are spaced apart from each other at a predetermined interval in a circumferential direction. The upper protrusions 51b1 extend in an axial direction. The upper protrusions 51b1 are deformed when the upper wall portion 51b is fitted in the lower opening 21a. By this, the state in which the upper wall portion 51b is fitted in the lower opening 21a may be good.

Lower protrusions 51c1 are positioned on an outer circumferential surface of the lower wall portion 51c. The plurality of lower protrusions 51c1 are spaced apart from each other at a predetermined interval in a circumferential direction. The lower protrusions 51c1 extend in an axial direction. The lower protrusions 51c1 are deformed when the lower wall portion 51c is fitted in the inside of the bracket cylindrical portion 31b. By this, the state in which the lower wall portion 51c is fitted in the bracket cylindrical portion 31b may be good.

The brush card flange portion 52 extends radially outward from the upper wall portion 51b, while the brush card flange portion 52 has a circular shape enclosing the upper wall portion 51b in a circumferential direction at a predetermined radial width. That is, the brush card flange portion 52 extends radially from the brush card cylindrical portion 51. The brush card flange portion 52 extends more radially outward than the housing cylindrical portion 21. The brush card flange portion 52 is positioned between the housing flange portion 22 and an axial direction of the bracket flange portion 31c.

As illustrated in FIG. 2, the connector part 53 protrudes radially outward from the brush card flange portion 52. That is, the connector part 53 is disposed on a radially outer side than the brush card flange portion 52. The connector part 53 has a connector connecting portion 53a and a connector cylindrical portion 53b. The connector connecting portion 53a connects between the brush card flange portion 52 and the connector cylindrical portion 53b. As illustrated in FIGS. 2 and 3, the top surface and the bottom surface of the brush card flange portion 52 and top surface and the bottom surface of the connector connecting portion 53a are connected to each other on the same plane. As illustrated in FIG. 3, the connector connecting portion 53a is positioned in the radial opening 11. That is, a portion of the connector part 53 is positioned in the radial opening 11.

The connector cylindrical portion 53b has a cylindrical shape which extends upwardly from an end of radially outer side of the connector connecting portion 53a. The connector cylindrical portion 53b has a connector opening 53c which is open at an upper portion thereof. The connector cylindrical portion 53b is exposed outside the housing 20 and the bracket 30. The connector cylindrical portion 53b is connected to an external power supply (not illustrated).

As illustrated in FIG. 4, the brush 54 is slidably positioned radially in a box-shaped housing portion which is positioned on the top surface of the circular portion 51a. An end of radially outer side of the brush 54 is pressed radially inward by the spring 57. As illustrated in FIG. 3, a radially inner end of the brush 54 contacts the commutator 44. In FIG. 4, the brush card assembly 50 has, for example, two brushes 54.

The choke coil 55 is positioned on the top surface of the circular portion 51a. One end of the choke coil 55 is electrically connected to the brush 54. The other end of the choke coil 55 is electrically connected to the connection terminal 56.

The connection terminal 56 is held at the brush card 50a. The connection terminal 56 protrudes upwardly from the bottom portion of the connector opening 53c. The connection terminal 56 is electrically connected to the external power supply (not illustrated) connected to the connector part 53. By this, a current is supplied to the commutator 44 from the external power supply through the connection terminal 56, the choke coil 55, and the brush 54. That is, the brush card assembly 50 supplies a current to the armature 40. When being supplied with a current from the commutator 44, the armature 40 is excited. By this, a rotor including the armature 40 rotates by a magnetic interaction between the armature 40 and a magnet 70.

As illustrated in FIGS. 1 and 3, the seal member 60 is positioned between the housing 20 and the bracket 30. The seal member 60 is made of elastomer. According to this embodiment, a material of the seal member 60 may be made of, for example, thermosetting elastomer (rubber) and thermoplastic elastomer. As illustrated in FIG. 2, the seal member 60 has an upper seal portion (first seal portion) 61 and a lower seal portion (second seal portion) 62. According to this embodiment, the upper seal portion 61 and the lower seal portion 62 are, for example, separate members.

As illustrated in FIG. 3, the upper seal portion 61 is positioned over the brush card flange portion 52. The upper seal portion 61 seals between the brush card flange portion 52 and the housing 20. As illustrated in FIGS. 2 and 3, the upper seal portion 61 has a circular shape enclosing the shaft 41 in a circumferential direction. Therefore, it is possible to seal between the brush card flange portion 52 and the housing over the entire circumference. By this, it is possible to improve waterproof property of the motor 10.

An axial dimension of the upper seal portion 61 is, for example, uniform. As illustrated in FIG. 2, the upper seal portion 61 has an upper ring portion 63 and an upper intervening portion 64. As illustrated in FIGS. 2 and 3, the upper ring portion 63 has a circular shape enclosing the upper wall portion 51b in a circumferential direction. According to this embodiment, the upper ring portion 63 is fitted in, for example, radially outer side of the upper wall portion 51b.

As illustrated in FIG. 5, the upper ring portion 63 is positioned between a brush card flange portion top surface 52a which is the top surface of the brush card flange portion 52 and the housing 20. The upper ring portion 63 contacts the brush card flange portion top surface 52a and the housing flange bottom surface 23. That is, the upper seal portion 61 which is the first seal portion is fitted between the brush card flange portion top surface 52a and the housing 20 while contacting the brush card flange portion top surface 52a and the housing 20.

An axial dimension between the brush card flange portion top surface 52a and the housing flange portion bottom surface 23 is smaller than that in an axial direction of the upper ring portion 63 at ordinary times (when being not applied with an external force). Therefore, when the upper ring portion 63 is fitted between the brush card flange portion top surface 52a and the housing flange portion bottom surface 23, the upper ring portion 63 is applied with a compressive force. By this, the upper ring portion 63 is expanded in the radial direction while being contracted in an axial direction.

An end of radially outer side of the upper ring portion 63 contacts the housing flange portion bottom surface 23 and the inclined surface 32d. That is, the upper seal portion 61 which is the first seal portion is fitted between the housing 20 and the bracket 30 through the inclined surface 32d while contacting the housing 20 and the bracket 30. In particular, since the upper ring portion 63 is expanded radially outward, an adhesion of the upper ring portion 63 to the fixed wall portion inner side surface 32b is more increased. By this, high sealing performance is realized.

For example, like the electric motor disclosed in Japanese Patent Laid-Open Publication No. 2014-110697, the fixed wall portion inner side 32b is cut radially outward to form opposite surfaces facing the housing flange portion bottom surface 23 while being orthogonal to the axial direction. The structure that the opposite surfaces have the upper seal portion 61 provided therebetween due to the housing flange portion bottom surface 23 may be considered. In this case, if an axial dimension between the opposite surfaces and the housing flange portion bottom surface 23 is equal to that in an axial direction between the brush card flange portion top surface 52a and the housing flange portion bottom surface 23, even when the axial dimension of the upper seal portion 61 is uniform as in this embodiment, the upper seal portion 61 may be fitted between the housing 20 and the bracket 30 while being fitted between the brush card flange portion 52 and the housing 20.

However, the brush card 50a and the bracket 30 are separate members and may be materials different from each other. Therefore, a dimensional error of each element itself and an assembling error due to the assembling of the elements may easily occur. By this, unless each dimension is strictly managed, it is difficult to make the axial dimension between the opposite surfaces and the housing flange portion bottom surface 23 and the axial dimension between the brush card flange portion top surface 52a and the housing flange portion bottom surface 23 equal. Therefore, in this structure, it is difficult to appropriately sandwich the upper seal portion 61 between the brush card flange portion 52 and the housing 20 and between the housing 20 and the bracket 30, and therefore waterproof property is likely to be reduced.

Meanwhile, for example, like a first seal main body illustrated in FIG. 5 of Japanese Patent Laid-Open Publication No. 2014-110697, a portion fitted in the housing flange portion bottom surface 23 and the opposite surface at the upper seal portion is made in an O ring shape, the dimensional error in the axial direction between the opposite surfaces and the housing flange portion bottom surface 23 is easily absorbed by the portion having the O ring shape. Therefore, it is easy to appropriately sandwich the upper seal portion. In this case, however, there is a need to make the portion sandwiched between the brush card flange portion 52 and the housing 20 at the upper seal portion thin and the portion sandwiched between the housing 20 and the bracket 20 thick. Therefore, due to the shape of the seal portion as described above, the axial dimension is not uniform but is complicated, and as a result time and costs required to manufacture the seal portion may be increased.

Further, in the structure in which the fixed wall portion inner side surface 32b is cut radially outward, the opposite surfaces are installed, such that a space of the fixed wall portion 32 in which the mounting hole portion 36 and the fixed hole portion 37 are installed may be reduced. Therefore, when the space, in which the mounting hole portion 36 and the fixed hole portion 37 are installed, is secured, the radial dimension of the bracket 30 may be easily enlarged.

In connection with these problems, according to this embodiment, the upper seal portion 61 is fitted between the housing 20 and the bracket 30 through the inclined surface 32d while contacting the housing 20 and the bracket 30. Therefore, even when the dimensional error and the assembling error occur in each element of the upper seal portion 61, etc., the upper seal portion 61 may contact any position of the inclined surface 32d to sandwich between the housing 20 and the bracket 30. By this, even when the axial dimension of the upper seal portion 61 is uniform, the upper seal portion 61 may be sandwiched in the portion where the axial dimension between the inclined surface 32d and the housing flange portion bottom surface 23 is equal to the axial dimension between the brush card flange portion top surface 52a and the housing flange portion bottom surface 23.

Therefore, compared with the structure in which the fixed wall portion inner side 32b of Japanese Patent Laid-Open Publication No. 2014-110697 as described above is cut radially outward to form the opposite surfaces, according to this embodiment, the structure of the upper seal portion 61 may be simplified and the upper seal portion 61 may be appropriately easily sandwiched between the brush card flange portion 52 and the housing 20 and between the housing 20 and the bracket 30. As described above, according to this embodiment, it is possible to obtain the motor 10 having the structure capable of simplifying the shape of the seal member 60 while securing the waterproof property.

Further, since the inclined surface 32d is an inclined surface farther away from the center axis J as it goes toward the bonded surface between the housing 20 and the bracket 30, the radial dimension is smaller than the opposite surface orthogonal to the axial direction as disclosed in Japanese Patent Laid-Open Publication No. 2014-110697. By this, it is easy to secure the space of the fixed wall portion 32 in which the mounting hole portion 36 and the fixed hole portion 37 are installed. As the result, according to this embodiment, it is possible to suppress the radial dimension of the bracket 30 from increasing.

Although not illustrated in the drawings, the upper seal portion 61 is fitted between the housing 20 and the bracket 30 through the inclined surface 32d while contacting the housing 20 and the bracket 30, over the entire circumference of the inclined surface 32d. Further, as described above, the inclined surface 32d is installed over the range of 180° or more in the circumferential direction. Therefore, in the wide range in the circumferential direction, the upper seal portion 61 may be fitted between the housing 20 and the bracket 30 as well as the brush card flange portion 52 and the housing 20. By this, according to this embodiment, it is possible to more improve the waterproof property of the motor 10.

Further, according to this embodiment, as described above, the inclined surface 32d is installed over the whole in the circumferential direction except for the radial opening 11, in the radially inner surface of the bracket 30. Therefore, in a wider circumferential range, the upper seal portion 61 may be fitted between the housing 20 and the bracket 30 as well as the brush card flange portion 52 and the housing 20. By this, it is possible to improve the waterproof property of the motor 10.

As illustrated in FIG. 2, the upper intervening portion 64 extends radially outward from the upper ring portion 63. As illustrated in FIG. 3, the upper intervening portion 64 is positioned in the radial opening 11. The top surface of the upper intervening portion 64 contacts the housing flange portion bottom surface 23. The bottom surface of the upper intervening portion 64 contacts the top surface of the connector connecting portion 53a.

The lower seal portion 62 is positioned under the brush card flange portion 52. The lower seal portion 62 seals between the brush card flange portion 52 and the bracket 30. The lower seal portion 62 has a circular shape enclosing the shaft 41 in the circumferential direction. Therefore, it is possible to seal between the brush card flange portion 52 and the bracket 30 over the entire circumference. By this, it is possible to improve the waterproof property of the motor 10.

Like the upper seal portion 61, the lower seal portion 62 is also contracted in an axial direction but is expanded in the radial direction, such that the adhesion among the bottom surface of the brush card flange portion 52, the top surface of the bracket flange portion 31c, and the inner wall surface 32c may be good.

As illustrated in FIG. 2, the lower seal portion 62 has a lower ring portion 65, a lower intervening portion 66c, and intervening protrusions 66a and 66b. As illustrated in FIGS. 2 and 3, the lower ring portion 65 has a circular shape enclosing the lower wall portion 51c in a circumferential direction. According to this embodiment, the lower ring portion 65 is fitted in, for example, radially outer side of the lower wall portion 51c.

As illustrated in FIG. 5, the lower ring portion 65 is positioned between a brush card flange portion bottom surface 52b which is the bottom surface of the brush card flange portion 52 and the bracket 30. The lower ring portion 65 contacts the brush card flange portion bottom surface 52b and the bracket flange top surface 31f. That is, the lower seal portion 62 which is the second seal portion is fitted between the brush card flange portion bottom surface 52b and the bracket 30 while contacting the brush card flange portion bottom surface 52b and the bracket 30.

Therefore, according to this embodiment, it is possible to seal between the brush card flange portion 52 and the housing 20 and between the brush card flange portion 52 and the bracket 30 by the upper seal portion 61 which is the first seal portion and the lower seal portion 62 which is the second seal portion. By this, it is possible to improve the waterproof property of the motor 10.

An end of radially outer side of the lower ring portion 65 contacts the fixed wall portion inner side surface 32b. According to this embodiment, the lower ring portion 65 contacts the inner wall surface 32c. As illustrated in FIGS. 2 and 3, according to this embodiment, an axial dimension of the lower ring portion 65 is, for example, uniform.

As illustrated in FIG. 2, a lower intervening portion 66c extends radially outward from the lower ring portion 65. As illustrated in FIG. 3, the lower intervening portion 66c is positioned in the radial opening 11. The top surface of the lower intervening portion 66c contacts the bottom surface of the connector connecting portion 53a. The bottom surface of the lower intervening portion 66c connects the bracket flange portion top surface 31f.

As illustrated in FIG. 2, the intervening protrusions 66a and 66b protrude in an axial direction. In more detail, according to this embodiment, the intervening protrusions 66a and 66b protrude upwardly from the lower intervening portion 66c. The intervening protrusions 66a and 66b are positioned in the radial opening 11.

As illustrated in FIG. 4, the intervening protrusions 66a, 66b are positioned between the connector part 53 and the fixed wall portion 32 in the circumferential direction, and also positioned between the axial directions of the housing flange portion 22 and the bracket flange portion 31c. That is, the intervening protrusions 66a and 66b are disposed on both sides in the circumferential direction of the connector part 53 in the radial opening 11. Therefore, it is possible to suppress water from being infiltrated from a gap between the circumferential directions of the connector part 53 and the fixed wall portion 32 in the radial opening 11.

The intervening protrusion 66a contacts the fixed wall portion 32 and the connector connecting portion 53a. A circumferential dimension of the intervening protrusion 66a at ordinary times (when being not applied with an external force) is larger than, for example, a dimension between circumferential directions of the connector connecting portion 53a and the fixed wall portion 32. Therefore, if the intervening protrusion 66a is positioned in the radial opening 11, the compressive force in the circumferential direction is applied to the intervening protrusion 66a. By this, the intervening protrusion 66a is contracted in the circumferential direction, such that the adhesion between the intervening protrusion 66a and the connector connecting portion 53a and the adhesion between the intervening protrusion 66a and the fixed wall portion 32 may be good. Therefore, it is possible to more suppress water from being infiltrated from the gap between the circumferential directions of the connector part 53 and the fixed wall portion 32 in the radial opening 11c. This is similarly applied to the intervening protrusion 66b.

According to this embodiment, the intervening protrusions 66a and 66b have ribs 66d provided at both sides in the circumferential direction thereof. One of the ribs 66d of the intervening protrusion 66a contacts the fixed wall portion 32. The other rib 66d of the intervening protrusion 66a contacts the connector part 53a. The rib 66d is positioned in the radial opening 11c, such that the rib 66d may be deformed due to the compressive force applied to the intervening protrusion 66a. By this, it is possible to more improve the adhesion between the intervening protrusion 66a and the connector connecting portion 53a and the adhesion between the intervening protrusion 66a and the fixed wall portion 32. Therefore, it is possible to more suppress water from being infiltrated from the gap between the circumferential directions of the connector part 53 and the fixed wall portions 32, 34 in the radial opening 11c. This is similarly applied to the intervening protrusion 66b.

In FIG. 4, the state before the rib 66d is deformed, that is, the state in which an external force is not applied to the rib 66d is illustrated by a dotted line.

Although not illustrated in the drawings, an upper end of the intervening protrusion 66a contacts the upper intervening portion 64. A dimension obtained by adding an axial dimension of the intervening protrusion 66a at ordinary times (when being not applied with an external force) to an axial dimension of the upper intervening portion 64 at ordinary times is larger than, for example, the dimension between the axial directions of the housing flange portion 22 and the bracket flange portion 31c. Therefore, the housing 20 and the bracket 30 are fixed, such that the compressive force in the axial direction is applied to the intervening protrusion 66a and the upper intervening portion 64. By this, the intervening protrusion 66a and the upper intervening portion 64 are contracted in the axial direction, such that the adhesion between the intervening protrusion 66a and the bracket flange portion 31c and the adhesion between the upper intervening portion 64 and the housing flange portion 22 may be good. Therefore, it is possible to more suppress water from being infiltrated from the gap between the circumferential directions of the connector part 53 and the fixed wall portions 32, 34 in the radial opening 11. This is similarly applied to the intervening protrusion 66b.

Further, according to this embodiment, the following configuration may also be adopted. In the following description, the same components as the description are properly denoted by the same reference numerals, and therefore the description thereof may be omitted.

According to this embodiment, the seal member 60 may be configured to have a first seal portion fitted between the brush card flange portion top surface 52a and the housing 20 or between the brush card flange portion bottom surface 52b and the bracket 30 in the axial direction, while contacting the brush card flange portion top surface 52a and the housing 20 or the brush card flange portion bottom surface 52b and the bracket 30. That is, according to this embodiment, the lower seal portion 62 may also be the first seal portion.

Figure 6:
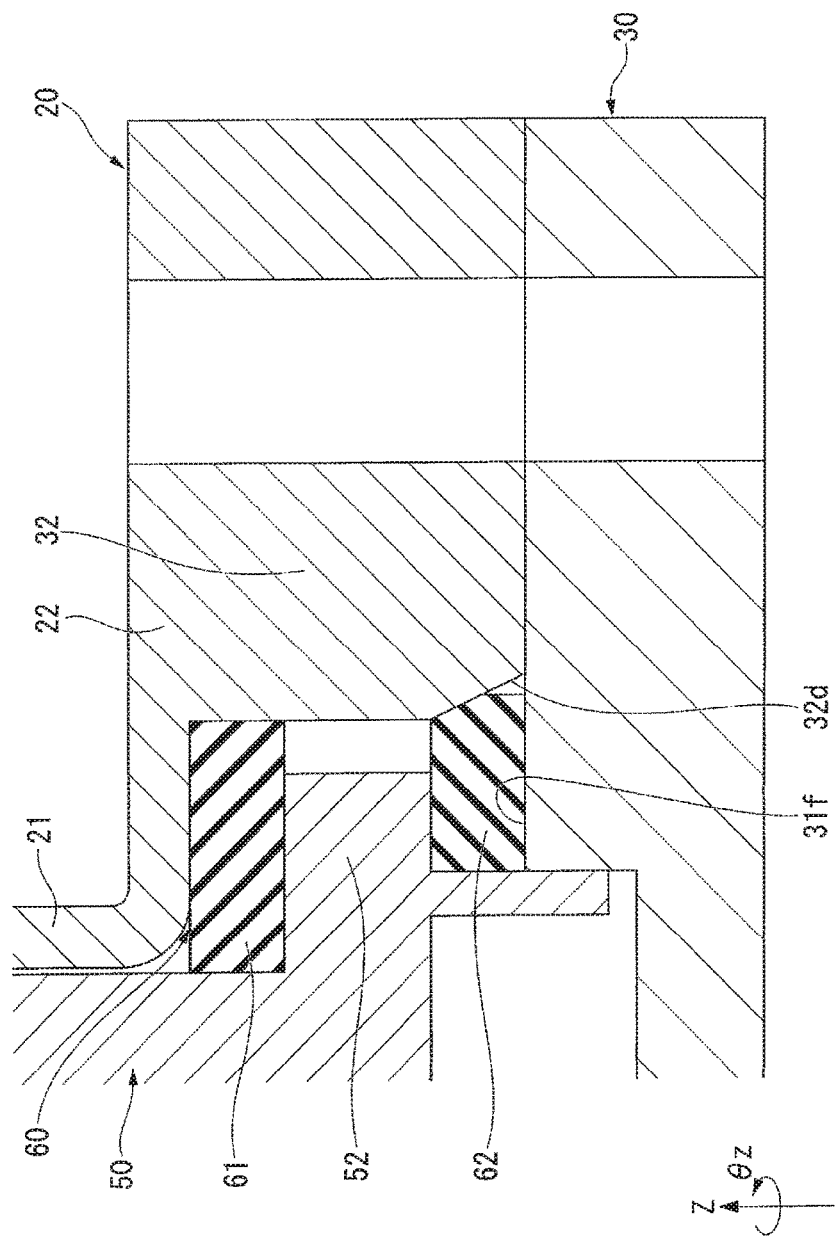
FIG. 6 is a cross-sectional view illustrating a portion of a motor according to another exemplary embodiment of the present disclosure.

In this configuration, for example, as illustrated in FIG. 6, the housing 20 has the fixed wall portion 32. FIG. 6 is a cross-sectional view illustrating a portion of a motor according to another exemplary embodiment of the present disclosure. The fixed wall portion 32 of the housing 20 extends downwardly from, for example, the housing flange portion 22. Further, the lower seal portion 62 is fitted between the inclined surface 32d of the fixed wall portion 32 of the housing 20 and the bracket flange portion top surface 31f while contacting the inclined surface 32d and the bracket flange portion top surface 31f.

Further, according to this embodiment, at least one of the radially inner surface of the housing 20 and the radially inner surface of the bracket 30 may be configured to have the inclined surface 32d. That is, according to this embodiment, only the radially inner surface of the housing 20 may also have the inclined surface 32d and both of the radially inner surface of the housing 20 and the radially inner surface of the bracket 30 may also have the inclined surface 32d. Further, the inclined surface 32d of the radially inner surface of the housing 20 is farther away from the center axis J as it goes from the top toward the bottom.

When both of the radially inner surface of the housing 20 and the radially inner surface of the bracket 30 have the inclined surface 32d, for example, both of the housing 20 and the bracket 30 have the fixed wall portion 32 and ends of each of the fixed wall portion 32 contact each other while facing each other. In this configuration, the surfaces of the insides in the radial directions at the ends of each of the fixed wall portions 32 are chamfered, such that the housing 20 and the bracket 30 have the inclined surface 32d. Further, for example, the upper seal portion 61 or the lower seal portion 62 is fitted between the inclined surface 32d of the housing 20 and the inclined surface 32d of the bracket 30 while contacting the inclined surface 32d.

Further, according to this embodiment, the inclined surface 32d may be configured to be installed over the entire circumference except for the radial opening 11, in at least one of the radially inner surface of the housing 20 and the radially inner surface of the bracket 30 may be configured to have the inclined surface 32d.

Further, according to this embodiment, at least one of the upper seal portion 61 and the lower seal portion 62 may configured to have the intervening protrusions 66a and 66b. That is, according to this embodiment, only the upper seal portion 61 may also have the intervening protrusions 66a and 66b and both of the upper seal portion 61 and the lower seal portion 62 may also have the intervening protrusions 66a and 66b. When the intervening protrusions 66a and 66b are installed at the upper seal portion 61, the intervening protrusion 66a and 66b extend downwardly from the upper intervening portion 64, for example.

Further, according to this embodiment, the intervening protrusions 66a, 66b may be configured to be installed to at least a part of the connector part 53 of the opening 11 in the circumferential direction. That is, according to this embodiment, only either one of the intervening protrusions 66a, 66b may be installed.

Further, according to this embodiment, upper ends of the intervening protrusions 66a and 66b may not contact the upper seal portion 61. Further, the number of intervening protrusions 66a,66b is not particularly limited and therefore the number of intervening protrusions 66a and 66b may be 1 and may be equal to or more than 3.

Figure 7:
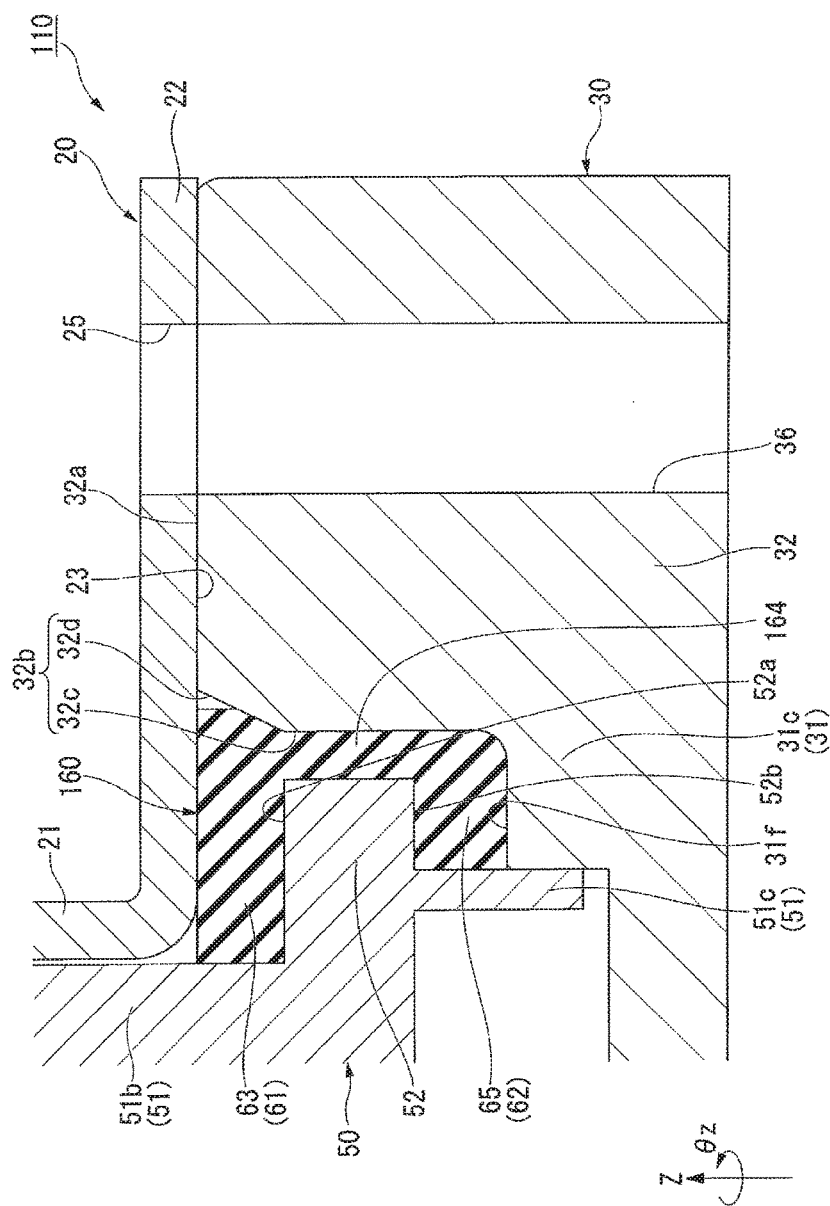
FIG. 7 is a cross-sectional view illustrating a portion of a motor according to another exemplary embodiment of the present disclosure.

Further, according to this embodiment, as the configuration illustrated in FIG. 7, the seal member 60 may also be a side wall portion 164. FIG. 7 is a cross-sectional view illustrating a portion of a motor 110 according to another exemplary embodiment of the present disclosure.

As illustrated in FIG. 7, the motor 110 includes a seal member 160. The seal member 160 is, for example, a single member. The seal member 160 has the upper seal portion 61, the lower seal portion 62, and the side wall portion 164.

The side wall portion 164 covers at least a part of the radially outer side of the brush card flange portion 52. The side wall portion 164 is disposed on the inside of the radial direction. In an example of FIG. 7, the side wall portion 164 contacts the radially outer surface of the brush card flange portion 52 and the inner wall surface 32c. An upper end of the side wall portion 164 is connected to the upper seal portion 61. A lower end of the side wall portion 164 is connected to the lower seal portion 62. That is, the upper seal portion 61 which is the first seal portion and the lower seal portion 62 which is the second seal portion are connected to each other through the side wall portion 164.

According to this embodiment, the side wall portion 164 covers at least a part of the radially outer side of the brush card flange portion 52, such that it is possible to suppress water from being infiltrated into the brush card assembly 50. Further, the upper seal portion 61 and the lower seal portion 62 are connected to each other by the side wall portion 164, such that it is possible to suppress water from being infiltrated into a gap between the upper seal portion 61 and the lower seal portion 62.

Further, according to this embodiment, the seal member 160 is a single member, such that it is easy to manage the seal member 160. Further, the number of elements used to manufacture the motor 110 may be reduced and thus the number of assembling processes and manufacturing costs may be reduced. Further, since the seal member 160 is mounted to enclose the brush card flange portion 52, for example, when an assembling method of mounting the seal member 160 in the brush card 50a and then disposing the brush card assembly 50 in the bracket 30 is adopted, the situation that the seal member 160 is peeled off does not occur while the brush card assembly 50 is disposed. Therefore, according to this embodiment, it is possible to facilitate the assembling of the motor 110.

Further, the gap between the upper seal portion 61 and the lower seal portion 62 and the side wall portion 164 does not occur, such that it is possible to more suppress water from being infiltrated into the brush card assembly 50.

Further, according to this embodiment, the seal member 160 may not be a single member. In this case, the side wall portion 164 may be a separate member from the upper seal portion 61 and the lower seal portion 62 and may also be a single member having at least one of the upper seal portion 61 and the lower seal portion 62.

Further, according to this embodiment, a material of the upper seal portion 61 and a material of the lower seal portion 62 may be different from each other.

Further, according to this embodiment, the seal member 60 may not have the lower seal portion 62 which is the second seal portion. Further, according to this embodiment, when the lower seal portion 62 is the first seal portion, the seal member 60 may not have the upper seal portion 61 which is the second seal portion.

Further, according to this embodiment, at least a part of the connector part 53 may be configured to be positioned in the radial opening 11. That is, according to this embodiment, the whole of the connector part 53 may also be positioned in the radial opening 11. Further, according to this embodiment, the connector part 53 may also protrude radially outward from the brush card cylindrical portion 51.

Further, according to this embodiment, the housing 20 may not have the housing flange portion 22. Further, according to this embodiment, the bracket 30 may not have the bracket flange portion 31c. Further, according to this embodiment, the housing 20 and the bracket 30 may not be made of metal. According to this embodiment, the housing 20 and the bracket 30 may be made of, for example, resin.

Figure 8:
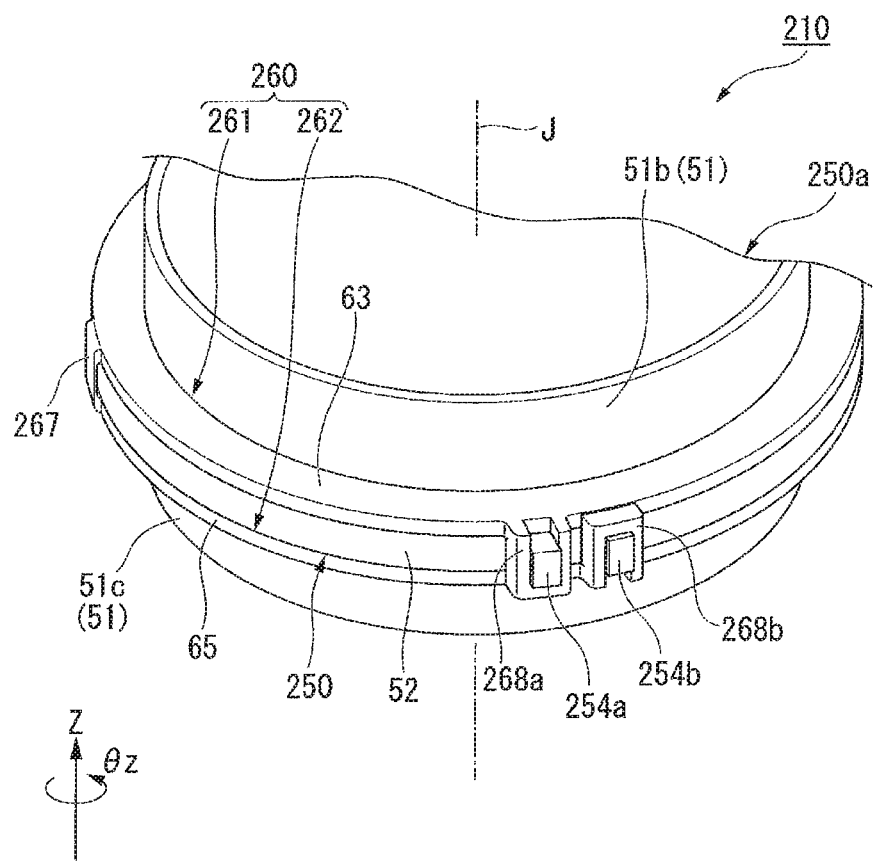
FIG. 8 is a perspective view illustrating a portion of a motor according to another exemplary embodiment of the present disclosure.

Next, another exemplary embodiment of the present disclosure will be described with reference to FIG. 8. This embodiment illustrated in FIG. 8 is different from the exemplary embodiment illustrated in FIG. 1 in that an upper seal portion 261 and a lower seal portion 262 are connected to each other by a hinge portion 267. Further, components of the exemplary embodiment illustrated in FIG. 8 are properly denoted by the same reference numerals as those of the exemplary embodiment illustrated in FIG. 1, etc., and therefore the description thereof may be omitted.

FIG. 8 is a perspective view illustrating a portion of a motor 210 according to another exemplary embodiment of the present disclosure. As illustrated in FIG. 8, the motor 210 includes a brush card assembly 250 and a seal member 260. The brush card assembly 250 has a brush card 250a. The brush card 250a has the brush card cylindrical portion 51, the brush card flange portion 52, and brush card protrusions 254a and 254b. That is, the brush card assembly 250 has the brush card protrusions 254a and 254b.

The brush card protrusions 254a and 254b protrude radially outward from the brush card flange portion 52. The brush card protrusion 254a and the brush card protrusion 254b are at different positions in the circumferential direction. Shapes of the brush card protrusions 254a, 554b are not particularly limited and therefore the brush card protrusions 254a and 254b have a square pillar shape.

The seal member 260 has the upper seal portion 261, the lower seal portion 262, and the hinge portion 267. The seal member 260 is a single member. The hinge portion 267 connects between the upper seal portion 261 and the lower seal portion 262.

Therefore, the seal member 260 is a single member and a relative position of the upper seal portion 261 and the lower seal portion 262 may be changed by bending or unfolding the hinge portion 267. By this, it is possible to separately assemble the upper seal portion 261 and the lower seal portion 262 while easily managing the seal member 260. Therefore, it is possible to suppress the assembling performance of the motor 210 from reducing.

Further, according to this embodiment, for example, the seal member 260 is more easily molded than the case in which the seal member 260 is molded as a single member in the state in which the relative position of the upper seal portion 261 and the lower seal portion 262 is fixed.

The upper seal portion 261 has the upper ring portion 63 and an upper seal mounting portion 268a. The upper seal mounting portion 268a extends downwardly from the radially outer surface of the upper ring portion 63. The upper seal mounting portion 268a is a circular shape. According to this embodiment, the upper seal mounting portion 268a is, for example, a rectangular circular shape. The upper seal mounting portion 268a is locked to the brush card protrusion 254a. That is, the seal member 260 is locked to the brush card protrusions 254a and 254b.

Therefore, it is possible to stably mount the seal member 260 on the brush card 250a. Further, for example, when an assembling method of mounting the seal member 260 on the brush card 250a and then disposing the brush card assembly 250 in the bracket 30 is adopted, it is possible to suppress the seal member 260 from being peeled off while the brush card assembly 250 is disposed. Therefore, according to this embodiment, it is possible to facilitate the assembling of the motor 210.

The lower seal portion 262 has the lower ring portion 65 and a lower seal mounting portion 268b. The lower seal mounting portion 268b extends upwardly from the radially outer surface of the lower ring portion 65. The lower seal mounting portion 268b is a circular shape. According to this embodiment, the lower seal mounting portion 268b is, for example, a rectangular circular shape. The lower seal mounting portion 268b is locked to the brush card protrusion 254b.

That is, according to this embodiment, both of the upper seal portion 261 and the lower seal portion 262 are locked to the brush card protrusions 254a and 254b. Therefore, it is possible to more stably mount the seal member 260 on the brush card 250a.

Further, according to this embodiment, the following configuration may also be adopted.

According to this embodiment, at least one of the upper seal portion 261 and the lower seal portion 262 may be configured to be locked onto the brush card protrusions 254a, 254b. That is, according to this embodiment, only either one of the upper seal portion 261 and the lower seal portion 262 may be configured to be locked to the brush card protrusions 254a and 254b. In this case, the brush card 250a has only either one of the brush card protrusions 254a, 254b. Further, only the locked seal portion of the upper seal portion 261 and the lower seal portion 262 has the upper seal mounting portion 268a or the lower seal mounting portion 268b.

Further, according to this embodiment, the seal member 260 may not be a single member. In this case, a material of the hinge portion 267 may be different from, for example, a material of the upper seal portion 261 and a material of the lower seal portion 262.

Further, each component of the exemplary embodiments illustrated in FIGS. 1 to 8 as described above may be properly combined within a range in which they conflict with each other.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor including a shaft having its center on a vertically extending center axis, comprising:
    an armature fixed to the shaft;
    a cylindrical housing having a lower opening portion which is open toward a lower side and accommodating the armature;
    a brush card assembly positioned in the lower opening portion and supplying a current to the armature;
    a cylindrical bracket positioned under the brush card assembly and directly fixed to the housing; and
    a seal member positioned between the housing and the bracket and made of elastomer,
    wherein the brush card assembly has a brush card cylindrical portion having a cylindrical shape and enclosing the shaft in a circumferential direction and a brush card flange portion extending radially outward from the brush card cylindrical portion,
    the seal member has a first seal portion fitted between a top surface of the brush card flange portion and the housing or a bottom surface of the brush card flange portion and the bracket in an axial direction while contacting the top surface and the housing or the bottom surface and the bracket,
    at least one of a radially inner surface of the housing and a radially inner surface of the bracket has an inclined surface getting farther away from the center axis as it goes toward a bonded surface between the housing and the bracket,
    the first seal portion is fitted between the housing and the bracket through the inclined surface while contacting the housing and the bracket
    the brush card assembly has a connector part disposed on radially outer side than the brush card flange portion,
    the motor is provided with a radial opening positioned between axial directions of the housing and the bracket, and open in the radial direction,
    at least a part of the connector part is positioned in the radial opening, and
    the inclined surface is installed over the entire circumference except for the radial opening, at least a radially inner surface of the housing, and the radially inner surface of the bracket.

2. The motor of claim 1,
    wherein the brush card assembly has a brush card protrusion protruding radially outward from the brush card flange portion, and
    the seal member is locked to the brush card protrusion.

3. The motor of claim 1,
    wherein the inclined surface is installed over a range of 180° or more in the circumferential direction, and
    the first seal portion is fitted between the housing and the bracket through the inclined surface while contacting the housing and the bracket, over the entire circumference of the inclined surface.

4. The motor of claim 3,
    wherein
    the first seal portion is fitted between the housing and the bracket through the inclined surface while contacting the housing and the bracket, over the entire circumference of the inclined surface.

5. The motor of claim 1,
    wherein the first seal portion is fitted between the top surface of the brush card flange portion and the housing while contacting the top surface of the brush card flange portion and the housing, and
    the seal member has a second seal portion is fitted between the bottom surface of the brush card flange portion and the bracket while contacting the bottom surface of the brush card flange portion and the bracket.

6. The motor of claim 5,
    wherein the seal member is a single member and has a side wall portion covering at least a part of the radially outer side of the brush card flange portion, and
    the first seal portion and the second seal portion are connected to each other through the side wall portion.

7. The motor of claim 5,
    wherein the seal member is a single member and has a hinge portion which connects between the first seal portion and the second seal portion.

8. The motor of claim 5,
    wherein
    at least one of the first seal portion and the second seal portion have an intervening protrusion which is disposed on at least a circumferential part of the connector part in the radial opening, and protrude in the axial direction.

9. The motor of claim 8,
    wherein the seal member is a single member and has a side wall portion covering at least a part of the radially outer side of the brush card flange portion, and
    the first seal portion and the second seal portion are connected to each other through the side wall portion.

10. The motor of claim 8,
    wherein the seal member is a single member and has a hinge portion which connects between the first seal portion and the second seal portion.

* * * * *